3,056,801
VIRUCIDAL 2,2',4,4' TETRAHYDROXY DIPHENYL SULFIDE FORMALDEHYDE REACTION-PRODUCTS
Charles F. Geschickter, Lorton, Va. (% The Geschickter Fund for Medical Research, Inc., 1834 Connecticut Ave. NW., Washington 9, D.C.)
No Drawing. Filed July 29, 1957, Ser. No. 674,569
9 Claims. (Cl. 260—326.5)

This invention relates to novel chemical compounds and the process of their use. More particularly, this invention relates to novel chemotherapeutic compounds useful in prolonging the life of animals infected with distemper virus and which compounds exhibit in certain cases life-saving properties with respect to such animals.

The control of virus infections by chemotherapy has not been accomplished to date for any of the large groups of these submicroscopic infectious agents. This invention concerns a group of novel synthetic compounds which are useful in prolonging the life of animals infected with distemper virus, and which exhibit in certain cases life-saving properties in such animals. The animals with which this application is particularly concerned are ferrets.

Accordingly it is a primary object of the present invention to provide novel chemical compounds and processes for their use.

A further object of the present invention is to provide novel therapeutic chemical compounds having particular use in the treatment of distemper viral infections in animals.

It is a further object of the present invention to provide novel therapeutic chemical compounds capable of prolonging the life of ferrets infected with distemper virus and which exhibit in certain cases life-saving properties in such animals.

It is a still further object of the present invention to provide a process of treatment of distempered animals.

The compounds of the invention are derivatives of diphenyl sulfide have the following general formula:

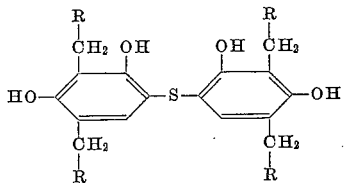

where, in the above formula, R is a di-alkylamino radical, such as the di-lower alkylamino radicals including dimethylamino, diethylamino, dipropylamino and dibutylamino; or a heterocyclic amino radical, such as N-piperidyl, N-pyrrolidino, N-morpholino, N-piperazino, or N'-methyl-piperazino. The radicals R may be the same or different from each other.

The compounds of the invention are prepared by reacting 2,2',4,4' tetrahydroxy diphenyl sulfide with formaldehyde and the appropriate dialkylamine or heterocyclicamine, or mixtures of these amines to yield the tetra-Mannich derivative.

The following examples illustrate the preparation of the novel compounds of the invention:

*Example I*

The preparation of 2,2',4,4'-tetrahydroxy-3,3',5,5'-tetra-(dimethylaminomethylene)-diphenyl sulfide is illustrated by the following two runs.

*Run 1.*—4.2 g. (0.015 mole) of 2,2',4,4'-tetrahydroxy diphenyl sulfide was dissolved together with 10 g. (0.12 mole) of dimethylamine hydrochloride in 60 ml. of water. The mixture was cooled and 7.9 ml. of 40% formalin solution was added. After standing at room temperature for 15 minutes, the mixture was refluxed 2 hours, cooled and filtered. The crude salt was precipitated by the addition of acetone and filtered off. The salt was dissolved in dilute sodium hydroxide solution and extracted with ether. The water layer was acidified with acetic acid and the base precipitated by the addition of acetone. The base was filtered off and washed with acetone and dried. The base was suspended in boiling water, then the mixture cooled and the solid filtered off, washed 4 times with water, twice with alcohol and twice with ether. The reddish solid on drying weighed 5 gm.

*Run 2.*—18.3 g. (0.064 mole) of 2,2',4,4'-tetrahydroxy diphenyl sulfide was mixed with 93 ml. (0.48 mole) of 25% aqueous dimethylamine solution. 32 ml. of formalin solution was added with cooling and the mixture allowed to stand at room temperature 40 minutes. After refluxing two hours the mixture was cooled, filtered and washed with water. The solid was slurried several times with water, then filtered, washed with alcohol and ether.

This solid weighed 10 gm. The aqueous solution was extracted with ether to remove dimethylamine, then treated with acetone to obtain 2 fractions, one weighing 6 gm., the second 1 gm.

*Example II*

For the preparation 2,2',4,4'-tetrahydroxy-3,3',5,5'-tetra-(diethylaminomethylene)-diphenyl sulfide, 25 gms. (0.1 mole) of 2,2',4,4'-tetrahydroxy diphenyl sulfide was mixed in a reaction flask, with cooling, with 58.5 gms. (0.8 mole) of diethylamine, 67 milliliters (0.8 mole) of concentrated HCl and 350 milliliters of water. A solution was formed. This mixture was continuously stirred and 45 milliliters of Formalin (40% formaldehyde) was added maintaining the temperature below 18° C. A clear solution was formed. The reaction mixture was allowed to stand one-half hour at room temperature, and then heated to reflux temperature. Thereafter, a red solid began to precipitate. The reaction mixture was then boiled two hours, cooled, the solid precipitate broken up and returned to the reaction flask. Thereafter, the reaction mixture was refluxed for two hours, cooled, and filtered. The filtrate was discarded. The red residue was washed by slurrying three times with water, twice with alcohol and once with ether. The residue was finally ground and dried over night. Thereafter, it was weighed and a yield of 30 gms. found. This product was insoluble in 5% HCl and 5% NaOH.

*Examples III–IX*

By procedures analogous to those used in Examples I and II, other compounds of the invention where all the radicals R in the foregoing general formula are the same, may be prepared by reacting 2,2',4,4'-tetrahydroxy diphenyl sulfide with an excess of formaldehyde and one of the following: dipropylamine, dibutylamine, piperidine, pyrrolidine, morpholine, piperazine or N-methyl piperazine.

*Example X*

The preparation of 2,2',4,4'-tetrahydroxy-3,3'-bis(dimethylaminomethylene)-5,5'-bis(N - pyrrolidino-methylene)-diphenyl sulfide is illustrated in the following example.

In a reaction flask, 25 gms. (0.1 mole) of 2,2',4,4'-tetrahydroxy diphenyl sulfide was mixed with 14.2 grams (0.2 mole) pyrrolidine, 16.3 gms. (0.2 mole) dimethylaminohydrochloride and 500 milliliters water. The mixture was cooled to 15° C. Thereafter, 45 milliliters of formalin (40% formaldehyde) was added. The mixture became cloudy but later cleared up. The mixture was allowed to stand one-half hour at room temperature.

Next, the mixture was heated for about one-half hour until a gel formed. Thereafter, NaOH (2–10%) was added to dissolve the gel. The reaction mixture was filtered and the filtrate made acid with acetic acid. No precipitate was then formed. Next, the mixture was treated with excess saturated sodium carbonate solution and allowed to stand overnight. The mixture was then filtered on a large filter and the solid precipitate washed twice with water and twice with alcohol. The precipitate was removed from the filter, slurried with alcohol, filtered, washed with alcohol and then washed several times with ether. The precipitate was ground and extracted once more with ether and allowed to dry. A yield of 40 gms. of product was obtained.

By procedures analogous to those used in Example X, other compounds of the invention wherein the radicals R are different from each other, may be prepared by reacting 2,2′,4,4′-tetrahydroxydiphenyl sulfide with an excess of formaldehyde and a mixture of the desired amines. As seen in Example X, the molar proportion of amines in the mixture is equal to the ratio of the number of the radicals R desired to be formed from particular amines. That is, if it were desired to form the compound of the invention wherein 3 R's are dimethylamino groups and 1 R is a pyrrolidine group, a mixture of amines would be employed in the reaction wherein the molar proportion of dimethyl amine to pyrrolidine would be 3:1.

The experiment used for testing the efficacy of the compounds comprising this invention was chosen because of its rigid screening qualifications. It consists of injecting or inoculating one dozen ferrets with distemper virus. These animals develop symptoms of both pneumonia and encephalitis and die within 12 to 14 days after the inoculation of the virus. The inoculation is 100 percent lethal for ferrets, according to the results in our laboratory and those in large commercial laboratories, such as Pittman-Moore, and has been used as a routine procedure for determining efficacy of vaccination procedures against this virus.

In the compounds described above, the therapeutic efficacy has been determined by inoculating 12 ferrets with the distemper virus and after 48 hours dividing the animals into two groups of 6 each. A compound that has previously proved ineffective is given to 6 animals and these animals all died uniformly within 12 to 14 days. In the other group of 6 animals, the compounds comprising this invention have been administered in small doses and their value has been demonstrated by protecting the animals from death for periods of 20 to 30 days longer. Under certain conditions, the therapeutic procedure may be life-saving, if the compound is of the chemical structure described above.

In treating distemper infections, the compounds of the invention may be administered intramuscularly to the subject in a daily dosage of 30 milligrams per kilogram of subject body weight. Treatment is continued daily for two weeks.

Treatment of subjects having distemper infections with the compounds of the invention protects the subjects from lethal effects of the infections for extended periods. Under certain conditions, life-saving effects may be achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A compound having the formula:

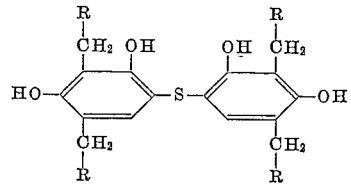

where R is selected from the group consisting of di-lower-alkyl amino radicals and heterocyclicamino radicals, and where the radicals R may be the same or different from each other.

2. 2,2′,4,4′ - tetrahydroxy-3,3′,5,5′-tetra(di-lower alkyl aminomethylene)-diphenyl sulfide.

3. 2,2′,4,4′ - tetrahydroxy - 3,3′,5,5′ - tetra(heterocyclic-amino methylene)-diphenyl sulfide.

4. 2,2′,4,4′-tetrahydroxy - 3,3′,5,5′-tetra(dimethylamino methylene)-diphenyl sulfide.

5. 2,2′,4,4′ - tetrahydroxy - 3,3′,5,5′-tetra(diethylamino methylene)-diphenyl sulfide.

6. 2,2′,4,4′-tetrahydroxy - 3,3′,5,5′-tetra(dipropylamino methylene)-diphenyl sulfide.

7. 2,2′,4,4′-tetrahydroxy - 3,3′,5,5′-tetra(dibutylamino methylene)-diphenyl sulfide.

8. 2,2′,4,4′ - tetrahydroxy - 3,3′ - bis(dimethylaminomethylene)-5,5′-bis(pyrrolidinomethylene)-diphenyl sulfide.

9. A compound as defined in claim 1 wherein R is a heterocyclicamino radical selected from the grorp consisting of piperidine, pyrrolidine, morpholine, piperazine and N-methyl piperazine.

References Cited in the file of this patent

Laidlaw and Dunkin: "Studies in Dog Distemper, V-The Immunization of Dogs," in Jl. of Comp. Path. & Therap., vol. 41 (1928) pp. 209–227.

Green et al.: "Vaccination of Dogs with a Modified Distemper Virus," in Vet. Med., vol. 35 (1940), pp. 302–304.